(12) United States Patent
Liang

(10) Patent No.: US 11,189,962 B2
(45) Date of Patent: Nov. 30, 2021

(54) CABLE CONNECTOR COMPRISING A SOFT BODY WITH A HARD CASING TO RESIST DEFORMATION

(71) Applicant: CHARDON TAIWAN CORPORATION, Miao Li Hsien (TW)

(72) Inventor: Tsung-Mien Liang, Miao Li Hsien (TW)

(73) Assignee: CHARDON TAIWAN CORPORATION, Miao Li Hsien (TW)

( * ) Notice: Subject to any disclaimer, the term of this patent is extended or adjusted under 35 U.S.C. 154(b) by 58 days.

(21) Appl. No.: 16/785,615

(22) Filed: Feb. 9, 2020

(65) Prior Publication Data

US 2021/0013670 A1   Jan. 14, 2021

(30) Foreign Application Priority Data

Jul. 8, 2019  (TW) ................................. 108208871

(51) Int. Cl.
*H01R 13/53* (2006.01)
*H01R 13/502* (2006.01)
*H01R 13/504* (2006.01)

(52) U.S. Cl.
CPC ........... *H01R 13/53* (2013.01); *H01R 13/504* (2013.01); *H01R 13/5025* (2013.01)

(58) Field of Classification Search
CPC .. H01R 13/53; H01R 13/5025; H01R 13/504; H02G 15/064

USPC ................................................ 439/278, 281
See application file for complete search history.

(56) References Cited

U.S. PATENT DOCUMENTS

| | | | | | |
|---|---|---|---|---|---|
| 3,401,370 | A | * | 9/1968 | Weinfurt | H01R 13/53 439/363 |
| 4,417,736 | A | * | 11/1983 | Herrmann, Jr. | H01R 13/53 277/606 |
| 4,621,881 | A | * | 11/1986 | Johansson | H01T 13/04 174/138 S |
| 4,734,055 | A | * | 3/1988 | Misu | H01R 13/56 174/153 G |
| 4,884,977 | A | * | 12/1989 | Sturdevan | H01T 13/04 439/125 |
| 8,649,160 | B2 | * | 2/2014 | Mills | H02B 1/04 361/636 |
| 2009/0215299 | A1 | * | 8/2009 | Hughes | H01R 13/504 439/278 |

* cited by examiner

*Primary Examiner* — Travis S Chambers
(74) *Attorney, Agent, or Firm* — Pai Patent & Trademark Law Firm; Chao-Chang David Pai

(57) ABSTRACT

A cable connector includes a soft body. The soft body has at least one connecting portion. An outer wall surface of the connecting portion is provided with a hard casing. The soft body is made of a soft material, such as rubber and silicone rubber. The hard casing is made of a hard material, such as plastic, and has higher rigidity than the soft body. When a bushing of a cable is inserted into the connecting groove of the connecting portion, the hard casing is configured to resist deformation, so that the connecting portion will not be deformed by insertion of the bushing, thereby improving the electrical connection between the cable connector and the bushing.

3 Claims, 6 Drawing Sheets

CABLE CONNECTOR COMPRISING A SOFT BODY WITH A HARD CASING TO RESIST DEFORMATION

FIELD OF THE INVENTION

The present invention relates to a cable connector, and more particularly to a cable connector applied to high-voltage electrical equipment.

BACKGROUND OF THE INVENTION

Generally, high-voltage electrical equipment often uses a cable connector to connect with external cables. Taking a common cable connector in the form of a reducing tap well as an example, the cable connector usually has at least one socket. The socket has a groove. A conductive screw is provided at the bottom of the groove. The cable is provided with a corresponding bushing. The bushing is provided with a conductive screw hole corresponding to the conductive screw. Thereby, the bushing is inserted into the groove, and the conductive screw is screwed with the conductive screw hole to connect the cable to the cable connector.

However, the cable connector is usually made of a soft material, such as rubber, and cannot resist radial deformation. When the user inserts the bushing of the cable into the groove of the socket, the socket will be deformed by insertion of the bushing, so that the bushing cannot be tightly and securely connected to the socket and it is easy to cause looseness and clearance when pulled by external force, which affects the electrical connection between the cable connector and the bushing. Accordingly, the inventor of the present invention has devoted himself based on his many years of practical experiences to solve these problems.

SUMMARY OF THE INVENTION

The primary object of the present invention is to provide a cable connector that has the ability to resist deformation and improves the electrical connection.

In order to achieve the aforesaid object, the cable connector of the present invention comprises a soft body and at least one hard casing. The soft body is made of a soft material and has at least one connecting portion. The connecting portion is concavely formed with a connecting groove. A connecting terminal is provided in the connecting groove. The hard casing is disposed around an outer wall surface of the connecting portion and located at a position corresponding to the connecting groove. Wherein, the hard casing is made of a hard material and has higher rigidity than the soft body.

In the cable connecter provided by the present invention, because the hard casing is provided on the outer wall surface of the connecting portion, and the hard casing is made of a hard material having higher rigidity than the soft body, when the user inserts a bushing of a cable into the connecting groove, the hard casing is configured to resist deformation, so that the connecting portion will not be deformed by insertion of the bushing, thereby improving the electrical connection between the cable connector and the bushing.

DETAILED DESCRIPTION OF THE PREFERRED EMBODIMENTS

Embodiments of the present invention will now be described, by way of example only, with reference to the accompanying drawings.

Figure 1:
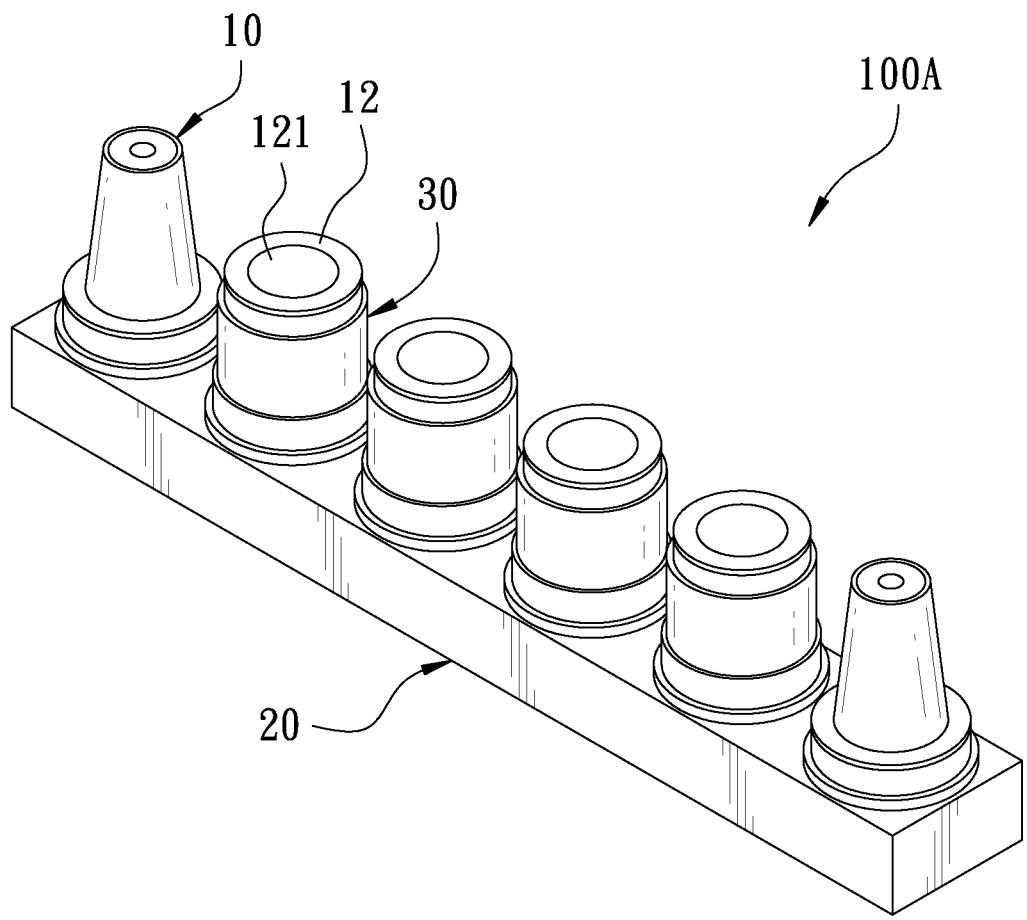
FIG. 1 is a perspective view in accordance with a first embodiment of the present invention.
Figure 2:
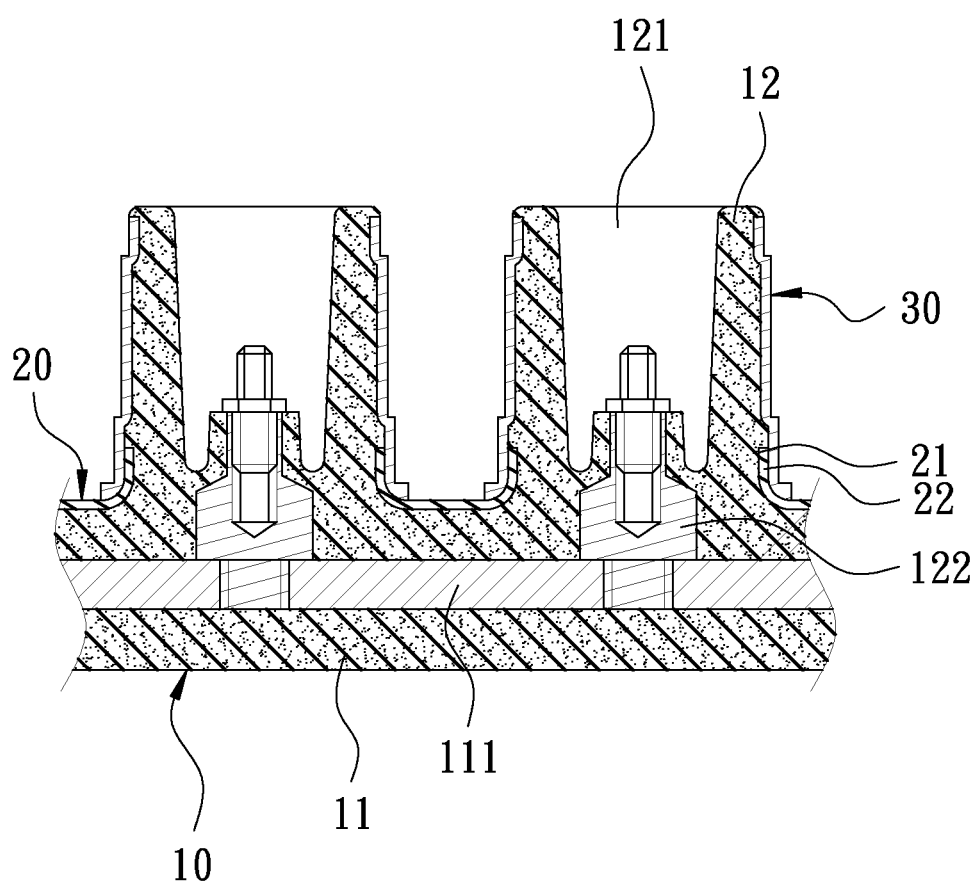
FIG. 2 is a partial cross-sectional view in accordance with the first embodiment of the present invention.

FIG. 1 is a perspective view in accordance with a first embodiment of the present invention. FIG. 2 is a partial cross-sectional view in accordance with the first embodiment of the present invention. The present invention discloses a cable connector 100A in the form of a multi-point junction, comprising a soft body 10, a base casing 20, and a plurality of hard casings 30.

The soft body 10 is made of a soft material including rubber or silicone rubber, such as EPDM. The soft body 10 has a base 11. A conductive portion 111 is embedded in the base 11. The outside of the base 11 is provided with a plurality of raised connecting portions 12 each serving as a female interface. An end portion of each connecting portion 12 is concavely formed with a generally conical connecting groove 121. A connecting terminal 122 is provided at the bottom of the connecting groove 121. The connecting terminal 122 is connected to the conductive portion 111.

The base casing 20 is disposed on the outside of the base 11. The base casing 20 has perforations 21 corresponding to the respective connecting portions 12, so that the corresponding connecting portions 12 are inserted in the perforations 21, respectively. Wherein, the base casing 20 is provided with a raised annular portion 22 on the periphery of each perforation 21. The raised annular portion 22 is arranged around each connecting portion 12. The height of the raised annular portion 22 is less than the height of the connecting portion 12.

The plurality of hard casings 30 are made of a hard material including plastic, such as polyacetylene (PAC), and have higher rigidity than the soft body 10. Each hard casing 30 is disposed around the outer wall surface of each connecting portion 12 and is located at a position corresponding to the connecting groove 121. Each hard casing 30 extends downward to cover the outside of the raised annular portion 22.

Figure 3:
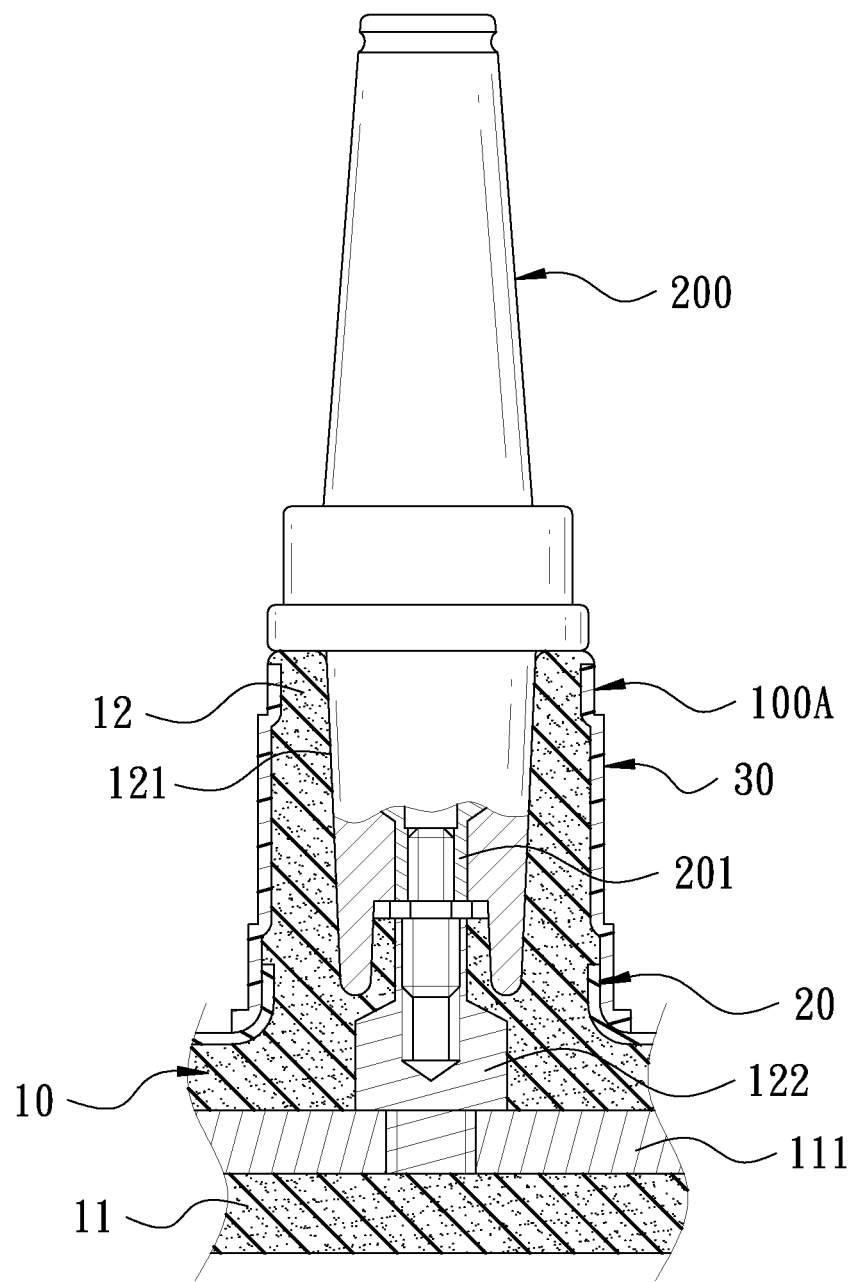
FIG. 3 is a schematic view in accordance with the first embodiment of the present invention when in use.

FIG. 3 is a schematic view in accordance with the first embodiment of the present invention when in use. The cable connector 100A is in cooperation with a bushing 200 of a cable when in use. The bushing 200 is inserted into the connecting portion 12 through the connecting groove 121, and a connecting terminal 201 of the busing 200 is threadedly connected to the connecting terminal 122 of the connecting portion 12. Because the hard casing 30 is provided on the outer wall surface of the connecting portion 12, and the hard casing 30 is made of a plastic material having higher rigidity than the soft body 10, when the bushing 200 is inserted in the connecting groove 121, the hard casing 30 is configured to resist radial deformation, so that the connecting portion 12 will not be deformed by insertion of the bushing 200. Therefore, the connection between the connecting portion 12 and the bushing 200 is tighter and firmer to ensure that no looseness or clearance occurs when pulled by an external force, thereby improving the electrical connection between the cable connector 100A and the bushing 200.

Figure 4:
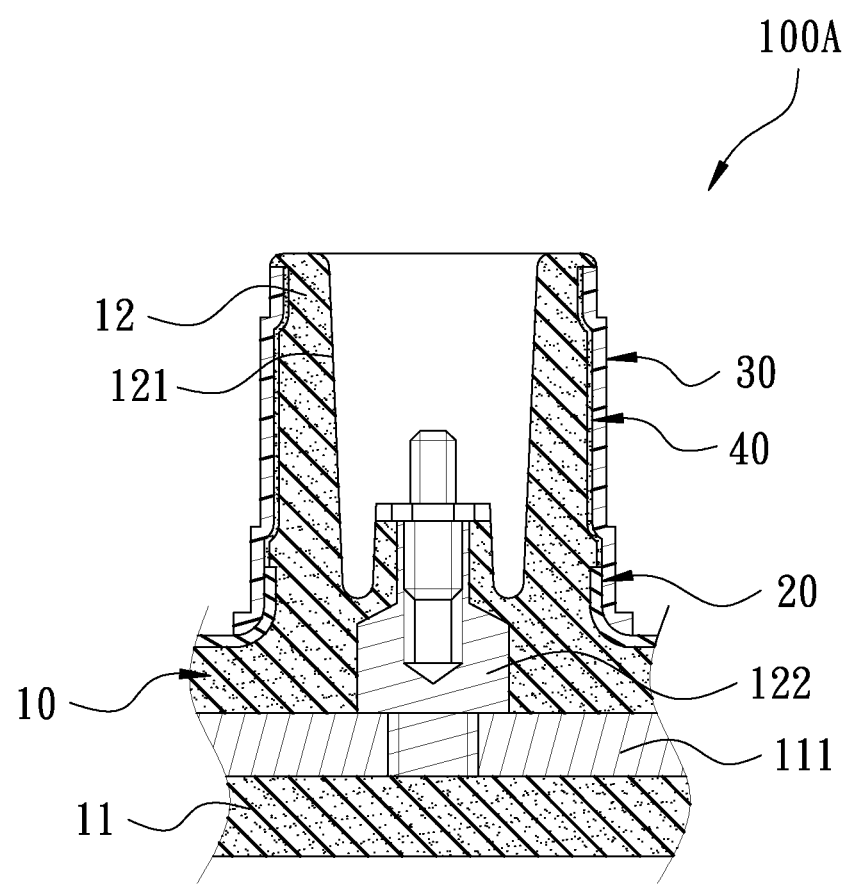
FIG. 4 is a partial cross-sectional view in accordance with a second embodiment of the present invention.

FIG. 4 is a partial cross-sectional view in accordance with a second embodiment of the present invention. The second embodiment is substantially similar to the first embodiment with the exceptions described hereinafter. Because the soft body 10 and the hard casing 30 are made of different materials, in order to prevent the hard casing 30 from falling off, the cable connector 100A is provided with an adhesive layer 40, such as a bridging agent, between the connecting portion 12 and the hard casing 30, thereby improving the joint strength of the hard casing 30 fixed to the outer wall surface of the connecting portion 12.

Figure 5:
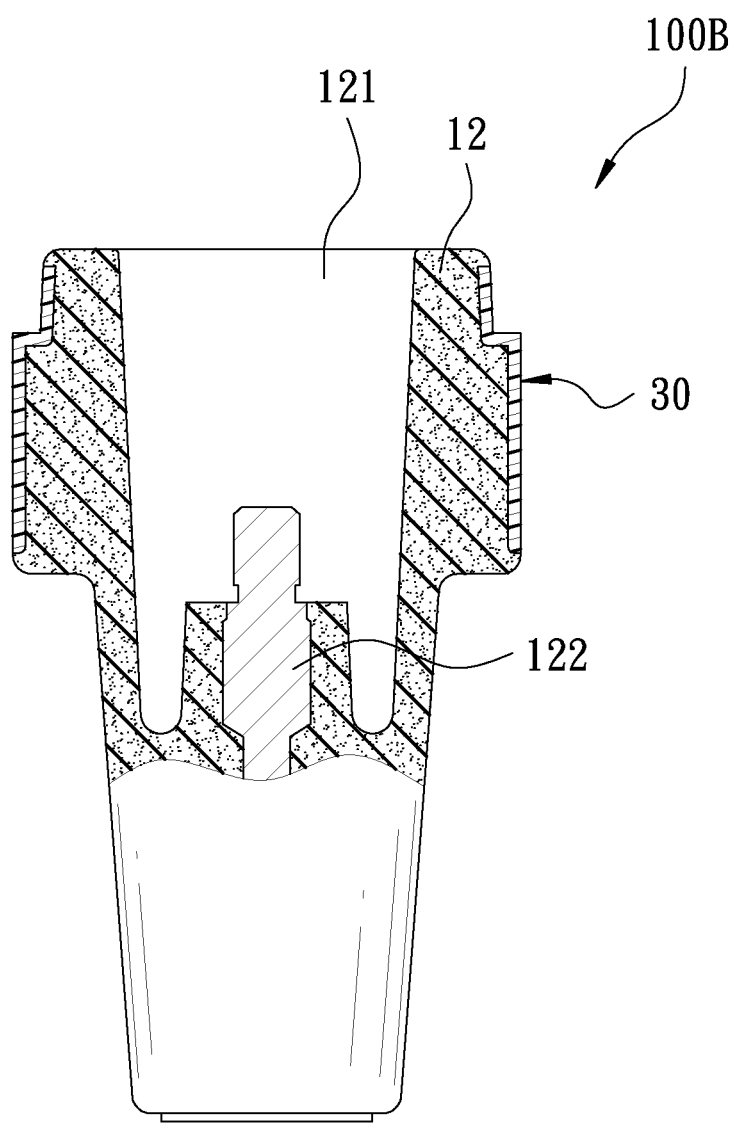
FIG. 5 is a partial cross-sectional view in accordance with a third embodiment of the present invention.

FIG. 5 is a partial cross-sectional view in accordance with a third embodiment of the present invention. Except that the present invention is applied to the cable connector 100A in the form of a multi-joint junction shown in the first and second embodiments, those skilled in the art can understand that the present invention can also be applied to other types of cable connectors, for example, a cable connector 100B in the form of a reducing tap well shown in this embodiment. The cable connector 100B has the soft body 10. One end of the soft body 10 is provided with the connecting portion 12. The connecting portion 12 is concavely formed with the connecting groove 121. The bottom of the connecting groove 121 is provided with the connecting terminal 122. The outer wall surface of the connecting portion 12 is provided with the hard casing 30. Thereby, the hard casing 30 also provides an anti-deformation effect to improve the electrical connection.

Figure 6:
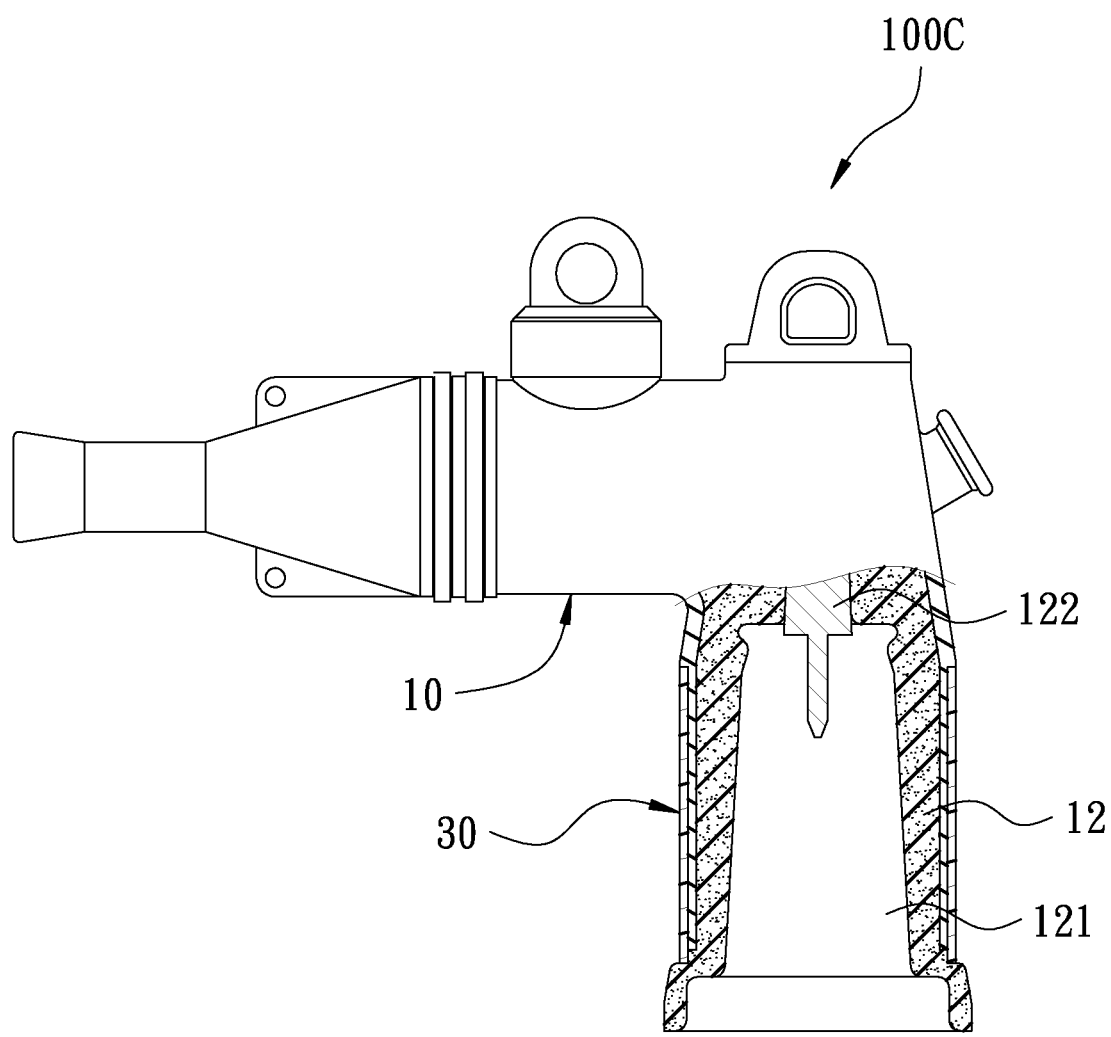
FIG. 6 is a partial cross-sectional view in accordance with a fourth embodiment of the present invention.

FIG. 6 is a partial cross-sectional view in accordance with a fourth embodiment of the present invention. This embodiment discloses a cable connector 100C in the form of an elbow. The cable connector 100C has the soft body 10. The soft body 10 is in an L-shape. One end of the soft body 10 is provided with the connecting portion 12. The connecting portion 12 is concavely formed with the connecting groove 121. The bottom of the connecting groove 121 is provided with the connecting terminal 122. The outer wall surface of the connecting portion 12 is provided with the hard casing 30. Thereby, the hard casing 30 also provides an anti-deformation effect to improve the electrical connection.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A cable connector, comprising:
    a soft body, made of a soft material and having a base, the base including a conductive portion therein, an outside of the base being provided with a plurality of connecting portions each serving as a female interface, each connecting portion being concavely formed with a connecting groove, a connecting terminal being provided in the connecting groove, the connecting terminal being connected to the conductive portion;
    a plurality of hard casings, each disposed around an outer wall surface of each connecting portion and located at a position corresponding to the connecting groove, the hard casings being made of a hard material and having higher rigidity than the soft body; and
    a base casing disposed on the outside of the base, the base casing having perforations corresponding to the respective connecting portions for insertion of the corresponding connecting portions, wherein a periphery of each perforation is provided with a raised annular portion, and each hard casing extends downward to cover an outside of the raised annular portion,
    wherein an adhesive layer is provided between each connecting portion and each hard casing.

2. The cable connector as claimed in claim 1, wherein the soft material is one of rubber and silicone rubber.

3. The cable connector as claimed in claim 1, wherein the hard material is plastic.

\* \* \* \* \*